United States Patent
Khojastepour et al.

(10) Patent No.: US 11,055,502 B2
(45) Date of Patent: Jul. 6, 2021

(54) SEQUENTIAL DETECTION BASED CLASSIFICATIONS OF RFID TAGS IN THREE-DIMENSIONAL SPACE

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US)

(73) Assignee: NEC Corporation

(*) Notice: Subject to any disclaimer, the term of this patent is extended or adjusted under 35 U.S.C. 154(b) by 79 days.

(21) Appl. No.: 16/517,941

(22) Filed: Jul. 22, 2019

(65) Prior Publication Data

US 2020/0050807 A1 Feb. 13, 2020

Related U.S. Application Data (60) Provisional application No. 62/717,067, filed on Aug. 10, 2018.

(51) Int. Cl.
*G06K 7/10* (2006.01)
(52) U.S. Cl.
CPC .................... *G06K 7/10366* (2013.01)
(58) Field of Classification Search
CPC .................................................. G06K 7/10366
USPC .................................................. 235/451
See application file for complete search history.

(56) References Cited

U.S. PATENT DOCUMENTS

| | | | |
|---|---|---|---|
| 9,977,865 B1* | 5/2018 | LaBorde | G16H 10/65 |
| 10,460,837 B1* | 10/2019 | La Borde | G06K 19/07749 |
| 10,719,674 B2* | 7/2020 | Fischer | G06K 19/0723 |
| 2008/0186178 A1 | 8/2008 | Tuttle et al. | |
| 2011/0035379 A1* | 2/2011 | Chen | G06K 9/6226 707/740 |
| 2011/0184806 A1* | 7/2011 | Chen | G06Q 30/02 705/14.52 |
| 2013/0162399 A1 | 6/2013 | Flammer, III | |
| 2017/0364715 A1 | 12/2017 | Sadr | |
| 2018/0137316 A1* | 5/2018 | Fischer | |
| 2019/0149725 A1* | 5/2019 | Adato | H04N 1/32144 348/158 |
| 2019/0213212 A1* | 7/2019 | Adato | G06Q 20/203 |

* cited by examiner

*Primary Examiner* — Paultep Savusdiphol
(74) *Attorney, Agent, or Firm* — Joseph Kolodka (57) ABSTRACT

Systems and methods for sequential detection-based classifications of radio-frequency identification (RFID) tags in three-dimensional space are provided. The methods include modeling a response from RFID tags as a probabilistic macro-channel and interrogating an RFID tag by transmitting a series of packets. Each packet is a transmit symbol and a first series of packet is a transmitted codeword. The method includes receiving, from the RFID tag, a second series of packets that is a received codeword in response to the transmitted codeword and finding a jointly typical transmit and receive codeword across all classes of macro-channels. The method also includes declaring a class of the RFID tag based on a largest likelihood between the transmitted codeword and the received codeword.

20 Claims, 6 Drawing Sheets

SEQUENTIAL DETECTION BASED CLASSIFICATIONS OF RFID TAGS IN THREE-DIMENSIONAL SPACE

RELATED APPLICATION INFORMATION

This application claims priority U.S. Provisional Patent Application No. 62/717,067, filed on Aug. 10, 2018, incorporated herein by reference herein its entirety.

BACKGROUND

Technical Field

The present invention relates to radio-frequency identification (RFID) and more particularly to detection of RFID tags.

Description of the Related Art

Passive RFID tags are getting cheaper and are readily available in a variety of configurations, sizes, read ranges, memory amounts, etc. for the price of a few cents per tag. Even though the use of RFID tags is not yet widespread, some stores are leveraging RFIDs in their daily operations and some governments have embarked on initiatives to deploy RFID based check-out in the next few years. The use of RFID tags for theft prevention has already been in place for almost a decade now, where expensive goods or small items that can be hidden or misplaced easily are tagged and RFID readers (placed at entrance/exit doors) alert the retailer if an item leaves the store without being already paid for.

SUMMARY

According to an aspect of the present invention, a method is provided for sequential detection-based classifications of radio-frequency identification (RFID) tags in three-dimensional space. The method includes modeling a response from RFID tags as a probabilistic macro-channel and interrogating an RFID tag by transmitting a series of packets. Each packet is a transmit symbol and a first series of packet is a transmitted codeword. The method also includes receiving, from the RFID tag, a second series of packets that is a received codeword in response to the transmitted codeword and finding a jointly typical transmit and receive codeword across all classes of macro-channels. The method also includes declaring a class of the RFID tag based on a largest likelihood between the transmitted codeword and the received codeword.

According to another aspect of the present invention, a system is provided for sequential detection-based classifications of radio-frequency identification (RFID) tags in three-dimensional space. The system includes a processor device operatively coupled to a memory device. The processor device models a response from RFID tags as a probabilistic macro-channel. The processor device is configured to interrogate an RFID tag by transmitting a series of packets. Each packet is a transmit symbol and a first series of packet is a transmitted codeword. The processor is also configured to receive, from the RFID tag, a second series of packets that is a received codeword in response to the transmitted codeword. The processor also finds a jointly typical transmit and receives codeword across all classes of macro-channels. The processor is configured to declare a class of the at least one RFID tag based on a largest likelihood between the transmitted codeword and the received codeword.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with aspects of the present invention, systems and methods are provided for sequential detection-based classifications of radio-frequency identification (RFID) tags in three-dimensional space. The methods include modeling a response from RFID tags as a probabilistic macro-channel and interrogating an RFID tag by transmitting a series of packets. Each packet is a transmit symbol and a first series of packet is a transmitted codeword. The methods also include receiving, from the RFID tag, a second series of packets that is a received codeword in response to the transmitted codeword and finding a jointly typical transmit and receive codeword across all classes of macro-channels. The methods include declaring a class of the RFID tag based on a largest likelihood between the transmitted codeword and the received codeword.

In one embodiment, checkout tunnels are designed using multiple antennas and combination of the received signal from those antennas. The example embodiments can accommodate the use of radio frequency (RF) absorbers, and RF reflectors to facilitate the shaping of tunnels. In example embodiments, a combination of received signal from different antennas along with their characteristics such as received signal strength indicator (RSSI), phase, doppler, etc., can be used to infer possible position of the RFID tag. In further example embodiments, observations of readings of the RFID tag by different antennas over time are used to improve the efficiency of the classifying process.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
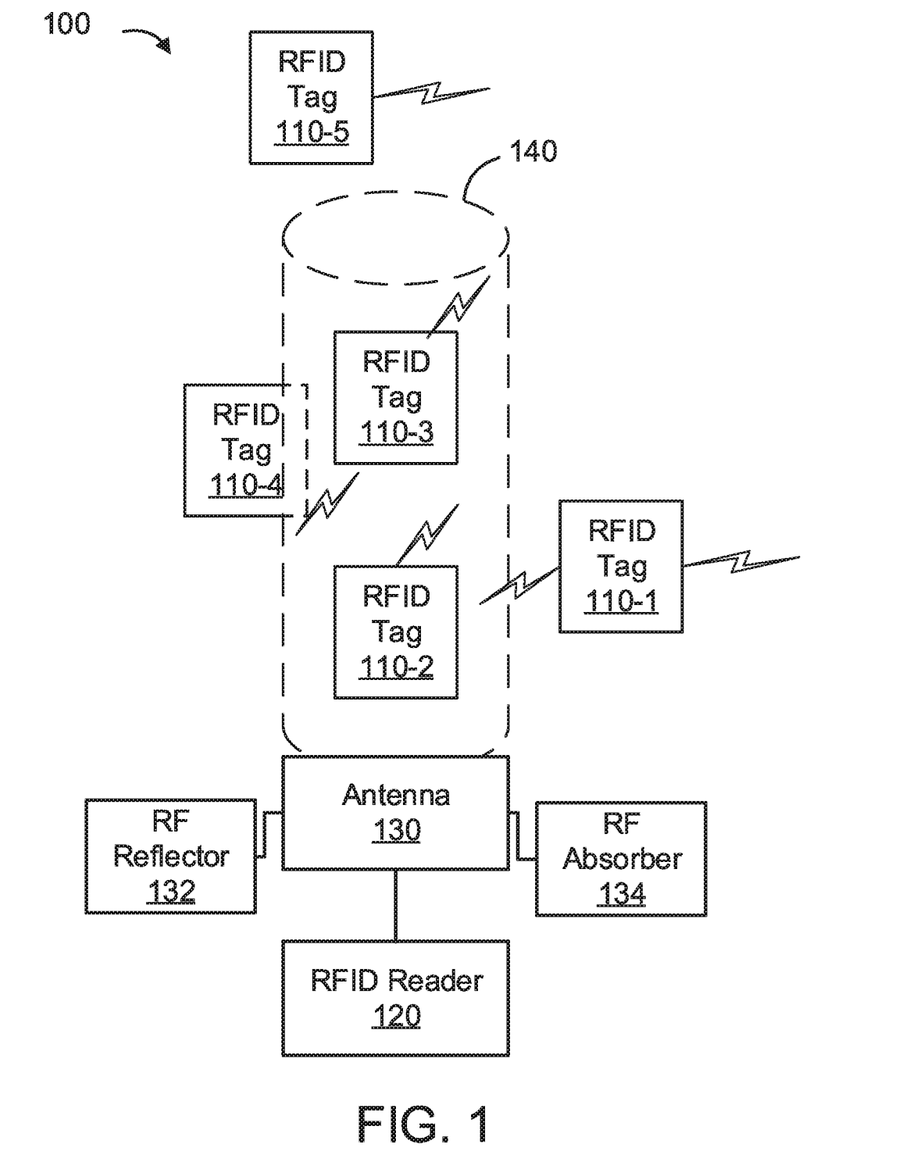
FIG. 1 is a block diagram illustrating a radio-frequency identification (RFID) reader with a tunnel generated by the RFID reader with RFID tags positioned in three-dimensional space with respect to the tunnel, in accordance with the present invention.

Referring now in detail to the figures in which like numerals represent the same or similar elements and initially to FIG. 1, a block diagram illustrating a radio-frequency identification (RFID) reader with a tunnel generated by the RFID reader with RFID tags positioned in three-dimensional space with respect to the tunnel is provided, in accordance with example embodiments.

As shown in FIG. 1, multiple RFID tags 110 (shown in plurality as 110-1 to 110-5) can be positioned in proximity to a checkout tunnel 140 generated by an antenna 130 (or antennas) of an RFID reader 120. In some embodiments the RFID reader 120 can include one or more radio frequency (RF) reflectors 132 and/or RF absorbers 134. RFID tags 110 bring a whole new set of advantages into automation of the checkout process as well as the store management. First, since RFID tags 110 are read wirelessly, there is no need to locate and present the RFID tag 110 in a specific way to the RFID reader antenna 130. Second, multiple items (for example, multiple RFID tags 110) can be scanned at, substantially, the same time by having them in the checkout area at once. Simultaneous reading is from the perception of human eye as the requirement for manual scanning of items (for example, RFID tags 110) is removed (when compared to prior systems). The underlying wireless communication with the RFID tags 110 occurs serially in a (very) short amount of time (for example, a fraction of a second). Third, RFID tags 110 reduce the possibility of human error since the RFID tags 110 in the vicinity of the checkout station (or checkout tunnel 140 or checkout bin) are read directly without a person presenting the tag to a reader that is the case in barcode systems. Hence, it is not possible to present a different (wrong) RFID tag 110, or not to scan the RFID tag 110, or scan an RFID tag 110 twice or more in error. Fourth, RFID tags 110 can mark each item with a unique ID (as opposed to a common ID used for the same item type in barcodes). Hence, it is easier to know exactly which item is sold and adjust the price of a similar item differently than others, for example, for a distressed or open-box merchandise. These benefits of using RFID in the checkout process manifest itself in both self-checkout systems using a checkout bin, checkout tunnel 140 or regular checkout counters where an attendant is present.

The example embodiments provide a system in which one or more areas are defined as (checkout) tunnels 140 and distinguish the presence of an RFID tag 110 in these areas. The checkout tunnels 140 refer to a particular three-dimensional volume (that can be defined as a portion of a particular open space or three-dimensional volume, as opposed to a closed underground space). A checkout tunnel 140 is separated from the rest of the three-dimensional volume by its boundary (for example, where the boundary is a connected surface). Part (or all) of the boundary may be marked by actual objects such as wall, doors, etc. where some other part (or, in some embodiments, all) may remain open and considered to be a virtual boundary.

In the example embodiments, the design of checkout tunnels 140 by using multiple antennas and combination of the received signal from those reader antennas 130. Example embodiments accommodate the use of RF absorbers 134, and RF reflectors 132 to facilitate the shaping of such tunnels 140. According to example embodiments, the received signal from different antennas 130 can be combined along with their characteristics such as received signal strength indicator (RSSI), phase, doppler, etc. and used to infer possible position of the tag. However, observing such readings of the RFID tag 110 by different antennas 130 over time can improve the efficiency of the systems described herein.

In the example embodiments, a session is defined as a four-dimensional section marked by a limited time interval in a particular checkout tunnel 140. the example embodiments are designed to identify RFID tag 110 accurately that are in different sessions. In other words, the example embodiments identify the presence of an RFID tag 110 within a checkout tunnel 140 in a particular time interval. Multiple sessions may overlap over some time interval, and the example embodiments determine the correct assignment of the RFID tags 110 to each session. Accordingly, the example embodiments handle interference from different antennas 130 in a way that these sessions are separable.

The example embodiments separate each tunnel 140 within a three-dimensional space by itself and further address multi-session challenges. The example embodiments identify every tag that is placed within the session and nothing else. Accordingly, some example embodiments handle a possible tag in vicinity of the tunnel 140 (for example, RFID tag 110-1 and RFID tag 110-4) such that the RFID tag 110 is considered out of the session (if not conclusively determined to be within a session). In other embodiments, RFID tags that are within a predetermined gray (or inconclusive) area around the tunnel 140 are separately identified, and an alert is provided via the system. Additionally, the example embodiments can logically and/or physically separate two different session that are running back to back on the same tunnel 140 in order to correctly identify items associated with particular sessions.

Figure 2:
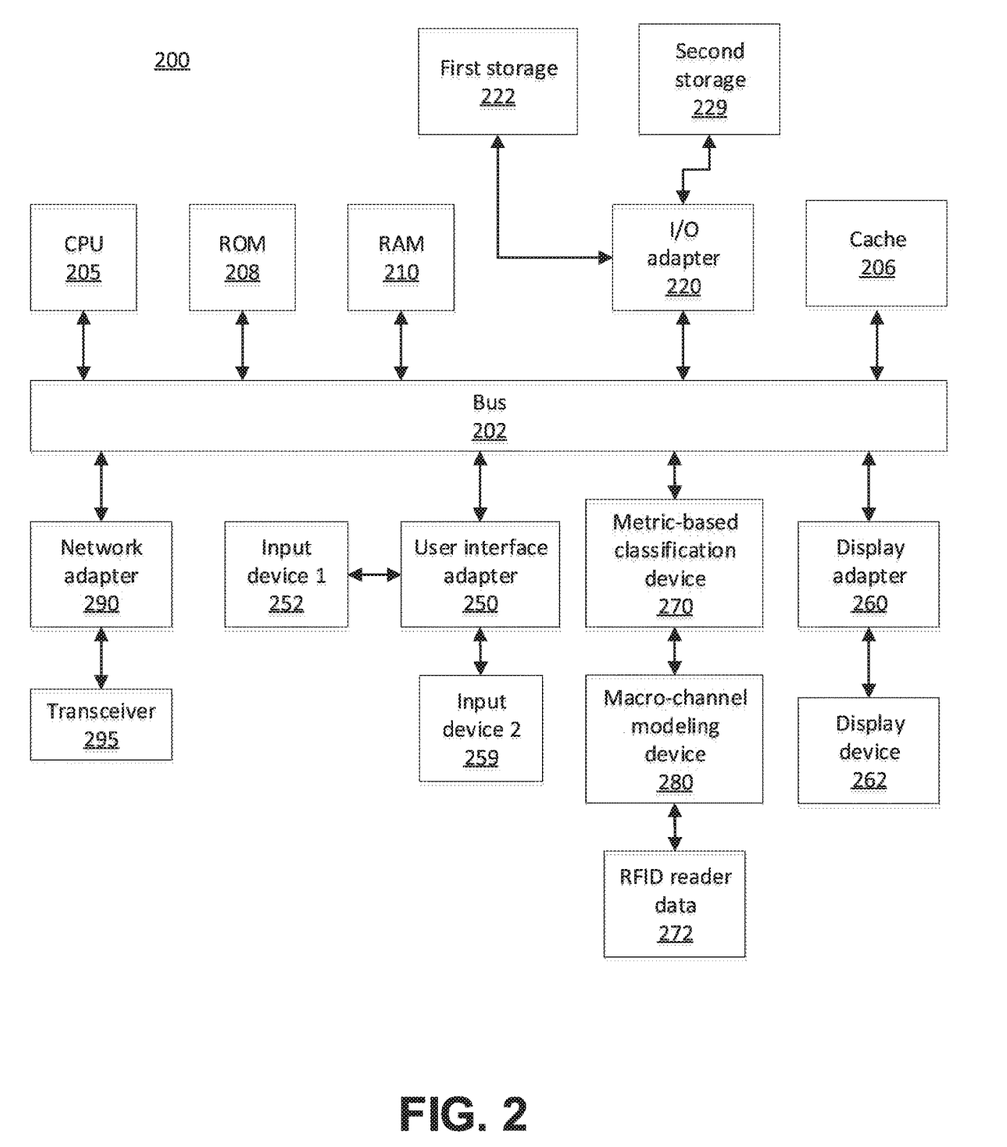
FIG. 2 is a block diagram illustrating a high-level system for sequential detection-based classifications of RFID Tags in three-dimensional space, in accordance with the present invention.

Referring now to FIG. 2, a high-level system for sequential detection-based classifications of RFID Tags in three-dimensional space is illustratively depicted in accordance with an embodiment of the present invention.

Exemplary computer system (e.g., a server or a network device) for sequential detection-based classifications of RFID Tags in three-dimensional space is shown in accordance with an embodiment of the present invention. The computer system 200 includes at least one processing device (CPU) 205 operatively coupled to other components via a system bus 202. A cache 206, a Read Only Memory (ROM) 208, a Random-Access Memory (RAM) 210, an input/output (I/O) adapter 220, a network adapter 290, a user interface adapter 250, a cluster modeling device 270, a cluster management device 280 and a display adapter 260, can be operatively coupled to the system bus 202.

A first storage device 222 and a second storage device 229 can be operatively coupled to system bus 202 by the I/O adapter 220. The storage devices 222 and 229 can be any of a disk storage device (e.g., a magnetic or optical disk storage device), a solid-state magnetic device, and so forth. The storage devices 222 and 229 can be the same type of storage device or different types of storage devices. Either or both of the storage devices 222 and 229 can be configured to operate as a data store or database to store various logs of RFID data 272 (e.g., session-based RFID reader data 272). The metric-based classification device 270, and macro-channel modeling device 280 can include software and/or hardware as described herein below.

A transceiver 295 can be operatively coupled to system bus 202 by network adapter 290. A display device 262 is operatively coupled to system bus 202 by display adapter 260. RFID (reader) data 272 can be operatively coupled to system bus 202 directly or indirectly, for example via metric-based classification device 270 and macro-channel modeling device 280. The macro-channel modeling device 280 can be configured to define macro-channel models by explicitly describing transition probabilities of the macro-channel models, for example as described herein below with respect to FIG. 4. The metric-based classification device 270 can be configured to receive RFID reader data 272 (for example, in real time) and find a (RFID) metric for each tag within an observation set for being within either of the predefined three-dimensional boundaries named as tunnel 140, and then use the RFID metric in the form of likelihood ratio to be compared with a given threshold in a sequential detection algorithm, for example as described herein below with respect to FIGS. 3 to 8.

A first user input device 252 and a second user input device 259 can be operatively coupled to system bus 202 by user interface adapter 250. The user input devices 252 and 259 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in accordance with the present invention. The user input devices 252 and 259 can be the same type of user input device or different types of user input devices. The user input devices 252 and 259 can be used to input and output information to and from system 200.

Other embodiments of the present invention can optionally include further processing units including a graphics processing unit ("GPU"), a mother board, or alternatively/additionally another storage medium, an operating system, one or more application software, as well as including one or more communication interfaces (e.g., RS232, Ethernet, Wi-Fi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Of course, the computer system 200 can also include other elements (not shown), as readily contemplated by one of skill in the art, as well as omit certain elements. For example, various other input devices and/or output devices can be included in computer system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 200 are readily contemplated by one of ordinary skill in the art given the teachings of the present invention provided herein.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system. As described in more detail below, some embodiments of the present invention can be wholly contained within a single computing device. Other embodiments, however, can encompass a plurality of interconnected or networked devices and resources.

Figure 3:
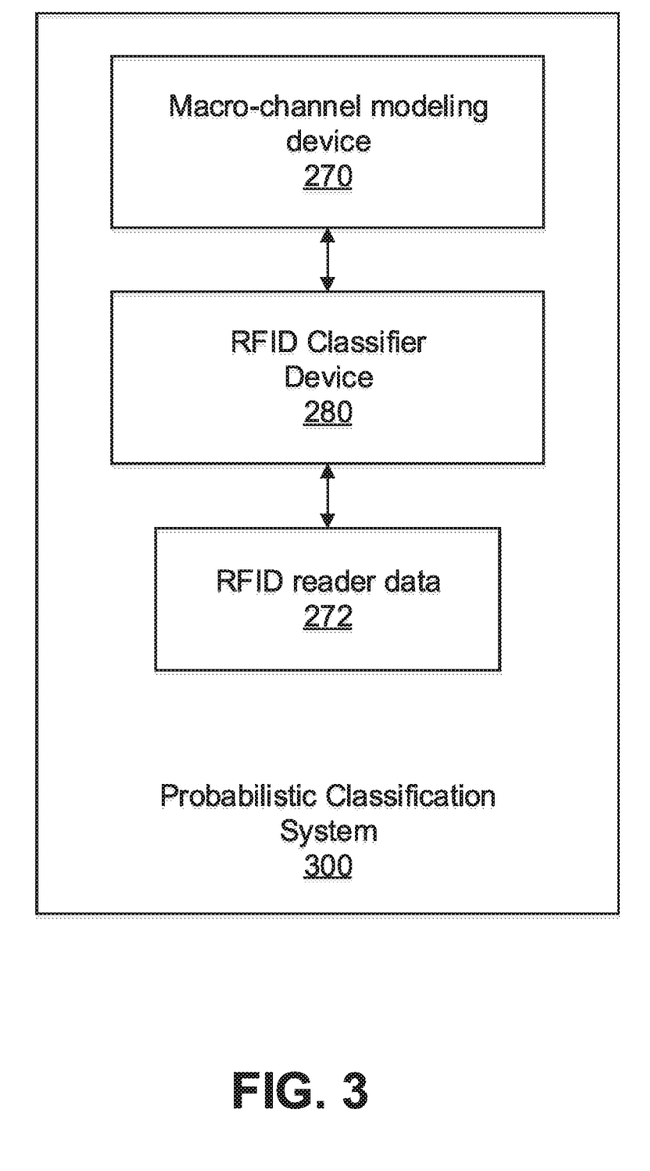
FIG. 3 is a block diagram illustrating a system configured to determine probabilistic classification, in accordance with the present invention.

FIG. 3 is a block diagram illustrating a probabilistic classification system 300 configured to determine probabilistic classification of RFID tags, in accordance with example embodiments.

As shown in FIG. 3, probabilistic classification system 300 includes metric-based classification device 270, and macro-channel modeling device 280 and receives RFID reader data 272 (for example, from checkout tunnels 140 and/or alternatively from stored training data sets).

The response of an RFID tag 110 is a function of the parameters and processing of the RFID reader 120 such as the transmit frequency, transmit power, antenna port number as well as the environmental effects such as reflection and absorption. Hence, the received reply by the RFID reader 120 (for example, interrogator) by nature is probabilistic. This means that even under the same set of parameters used by the RFID reader 120 there are many other parameters, for example, the proximity of the nearby RFID tags 110, and orientation of the RFID tags 110 that influence the generation of different replies (for (different but) similarly positioned RFID tags 110, such as, by way of illustration, RFID tags 110-2 and 110-3 in FIG. 1) including the possibility of no reply at all. For example, the reply from a first tag will be a function of other parameters, such as an orientation (or angle) of the first tag and the presence (or existence) of nearby tags such as a second tag, third tag, etc.

In the following, the example embodiments define a macro-channel that is an abstraction of the received reply under a given interrogation scenario and specified parameters. The example embodiments then use the abstraction while implementing techniques that are used to classify the tags in different regions namely checkout tunnels 140.

The example embodiments provide RFID systems that confine wireless signals in order to reduce interference as well as to remove the possibility of making error in reading an item that does not belong to a checkout bin (for example, that is contained within an area, a basket, etc., associated with a single paying entity). The example embodiments provide an ease of reading all items without directly scanning the items at once while distinguish between different items that a customer holds on their shopping basket (for example, within a checkout tunnel 140) and items that have not been placed (for example, fully) within the checkout tunnel 140 where the customer has decided to purchase some items and has not made a decision about other items. The systems can be integrated with theft prevention systems to automatically disable items (RFID tags 110) from sending alerts once the items have been processed.

In some example scenarios, while a customer is at the checkout station, other merchandises (for example, RFID tags 140) exist in the proximity of the checkout station (for example, RFID tags 110-1, 110-4, and 110-5, referring back to FIG. 1 described herein above). The example embodiments prevent the signal from the RFID reader 120 from reaching and identifying such items (for example, RFID tags 110) as associated with a particular session and thus prevents disruptions to the checkout process from reading undesirable (or incorrectly assigned) RFID tags 110.

The example embodiments can be used to reduce interference between multiple checkout stations closely positioned in one area of the store (since the reading from one checkout station might interfere with the reading from another checkout station) and thus allow for a tighter pitch between the checkout stations. The example embodiments can be used to implement multiple checkout stations in a smaller floor space. In addition to preventing interference between multiple readers, the example embodiments prevent reading tags from a nearby station in error and counting the RFID tags 110 toward the items associated with the current RFID reader 120 and checkout tunnel 140.

The example embodiments alleviate the requirement for an attendant to be present with RFID based checkout. The example embodiments provide similar advantages to having an attendant with a handheld equipment with a confined reading distance, such as a handheld RFID reader (not shown). In a similar manner in which a well-trained attendant can determine a proximity required to scan the items and hence can correctly scans all the items (maybe multiple at a time) and avoid bringing the handheld RFID reader close to the areas that the handheld RFID reader might pick up unwanted items, the example embodiments can provide defined areas and automated feedback mechanisms to inform a customer that the RFID tags 110 are within a proper area (for example, a checkout tunnel 140) for scanning. Also, example embodiments can be combined with visually marked areas in which the RFID reader 120 is enabled, for example, when the RFID reader 120 is in within a predetermined proximity of the items that are going to be scanned (and vice versa, the customer has brought the RFID tags within a proper area for scanning).

Figure 4:
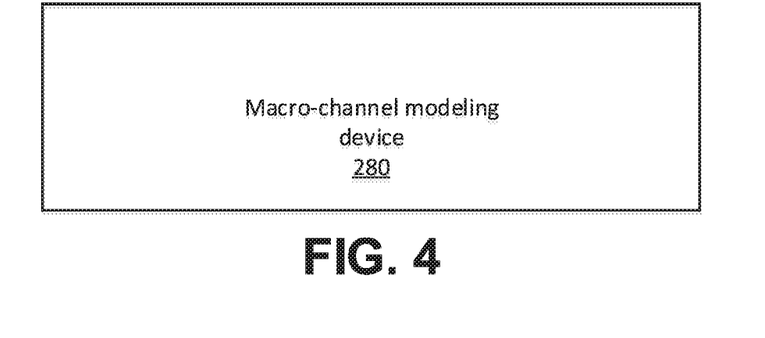
FIG. 4 is a block diagram illustrating a device configured to determine macro-channel models, in accordance with the present invention.

FIG. 4 is a block diagram illustrating a component 270 configured to determine macro-channel models, in accordance with example embodiments.

Macro-channel modeling device 270 defines the macro-channel models by explicitly describing transition probabilities of the macro-channel model. Macro-channel modeling device 270 analyzes an abstraction of the macro-channel model as a discrete memoryless channel with transition probability $f_i(y|x)$ where the channel output y is a vector of the received signal attributes such as received signal strength (RSSI), phase difference between the received signal and the transmitted signal, the doppler shift of the received signal, and possibly the number of received packet in a given interval that constitute one macro-channel use. The channel input x is also a vector that consists of the attributes that is used by the RFID reader 120 to interrogate the tag such as the antenna ports which takes its value from the set $\{a_1, a_2, \ldots, a_N\}$ for RFID system including N antenna ports, the frequency used for interrogating the tag, and the transmit power. Please note that the antenna port in this context may be connected to multiple antenna elements and feed multiple antennas simultaneously, for example, as a phased array antenna 130, or it may be used to drive to a single physical antenna element 130. Similarly, example embodiments can define a set of antenna ports by using different beamforming vectors over multiple antennas 130.

Using the definition of the macro-channel, macro-channel modeling device 270 formulates the problem as (for example, sets a target of) transmitting a codeword $x^n$ that consists of n uses of the channel represented as n-tuple in the form of $(x_1, x_2, \ldots, x_n)$ and observing the output $y^n=(y_1, y_2, \ldots, y_n)$ in order to find what channel is more likely to be associated with this observation.

Macro-channel modeling device 270 formulates the process of finding the most likely channel as finding which pair of $(x^n, y^n)$ is jointly typical over a set of channels $f_i(y|x)$, $i=1, 2, \ldots, M$ for finite set of such channels. As the codeword length grows large such joint typical decoding incurs diminishing error when the channel transition functions are distinct. Note that the problem of finding the location of the tag is identical to finding which channel is more likely to generate the output $y^n$ given the channel input is $x^n$.

The distance between the distributions of the channel probability can be determined by applying Kullback-Leibler divergence (KL distance) defined as:

$$D_{KL}(f_i^n, f_j^n) = -\sum_{y^n} f_i(y_k^n | x^n) \log \frac{f_j(y^n | x^n)}{f_i(y^n | x^n)}. \quad \text{Equation (Eqn.) (1)}$$

The indexes i and j refer to two different channels, the channel i and the channel j. f(a| b) is the channel transition probability which is the conditional probability of receiving a when b is transmitted, or the conditional probability of receiving a when the channel is excited by b. The larger the distance between the pairs of the channel transition probabilities the faster the convergence of the decoding algorithm as the codeword length grows large. KL distance is a function of the chosen codeword $x^n$ for the transmission. Accordingly, to optimize the system, the example embodiments pick up (for example, receive, identify, etc.) the transmit codeword that maximizes the minimum KL distance among all pair of channels of interest.

The example embodiments concentrate on finite set of channels based on a determination of channels in a neighborhood that have similar behavior (for example, based on a threshold of similarity). This similarity may be defined, for example, based on the distance $D_{KL}$ as described herein above. The lower the number of the channels in the channel set $f_i(y|x)$, i=1, 2, ..., M, the easier the maximization of the KL distance. Hence, it is easier to use smaller codeword to find the correct channel. In other words, there is less time used to transmit from different antennas to find the location of the tag (for a lower number of channels in the channel set).

However, at the same time, the lower the number of the channels in the channel set $f_i(y|x)$, i=1, 2, ..., M, the lower the resolution of the decoding algorithm in finding the actual position of the tag.

Further, as long as the KL distance is not zero, there is a guarantee that for long enough codewords all channels are distinguishable which means that the tag location can be identified within the partitioning that is done based on the resolution of the channels in the channel set $f_i(y|x)$, i=1, 2, ..., M.

Figure 5:
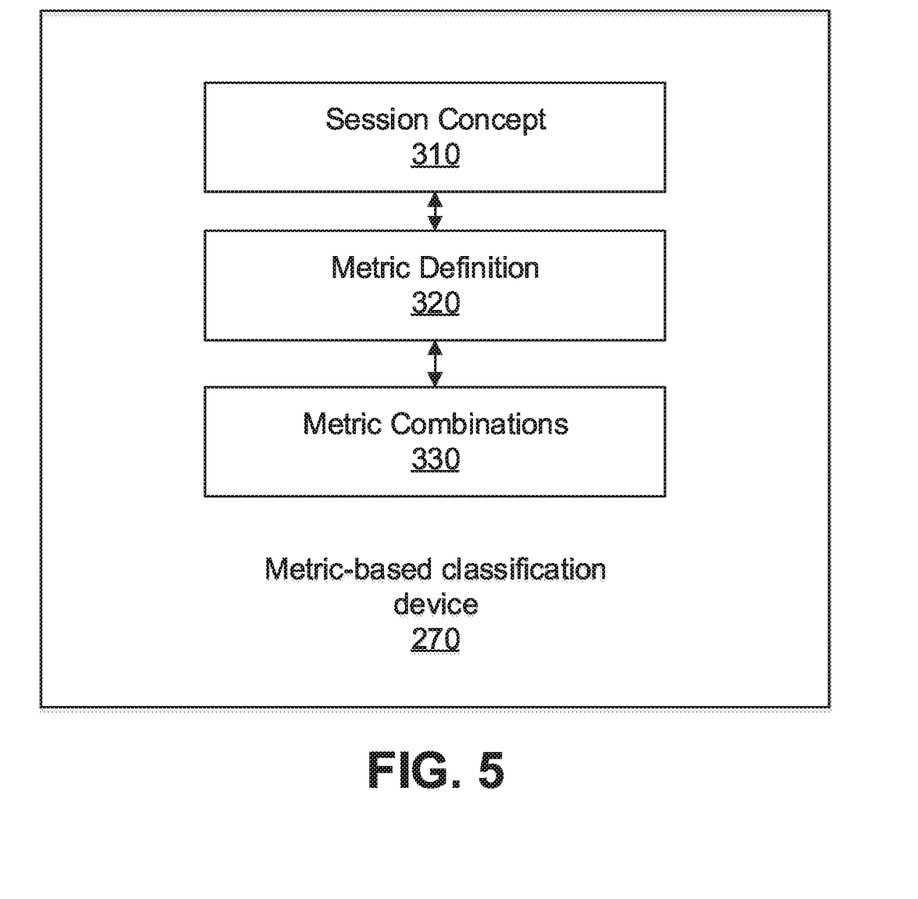
FIG. 5 is a block diagram illustrating a device configured to implement metric-based classification, in accordance with the present invention.

FIG. 5 is a block diagram illustrating a metric-based classification device 270 configured to implement metric-based classification, in accordance with example embodiments.

The example embodiments apply linear codes with finite codeword length in communication channels instead of jointly typical (as defined in information theory) decoding (which can be difficult in practice). Metric-based classification device 270 can apply the same (linear codes) in a decoding process for finding the RFID tags 110 within a specific checkout tunnel 140. In this section, the example embodiments implement simplified processes that can work (for example, are applicable, efficient, etc.) with small number of observations. The metric-based classification device 270 is configured to find a metric for each RFID tag 110 within a defined observation set for being within either of the predefined three-dimensional boundaries named as checkout tunnels 140. The value of metric represents the possibility or probability of the RFID tag 110 being in the given checkout tunnel 140.

Metric-based classification device 270 can interpret such metrics as a likelihood of an RFID tag 110 being in a certain checkout tunnel 140. Metric-based classification device 270 can then use this likelihood in the form of a likelihood ratio to be compared with a given threshold in a sequential detection process. The metric-based classification device 270 can truncate the sequential detection process in order to avoid (for example, intolerable, undesired, etc.) delays. In these instances, metric-based classification device 270 can modify a threshold for the sequential detection such that at each given time before a maximum time an RFID tag 110 could be assigned into one of the checkout tunnels 140 (including a tunnel 140 that represents the outside RFID tags 110), as well as staying undecided (whether to be included in a particular tunnel) for the moment. However, the final set of thresholds when the maximum time is reached must be inclusive of at least one of the checkout tunnels 140 and the process has to be ended by such decision.

Note that a session can end before the maximum session duration is reached. For example, metric-based classification device 270 can end the session through a trigger mechanism, for example by calculating a function and comparing it with a threshold. Alternatively, metric-based classification device 270 can decide the session end as soon as all the tags for which metric-based classification device 270 had outstanding readings have been classified.

Figure 6:
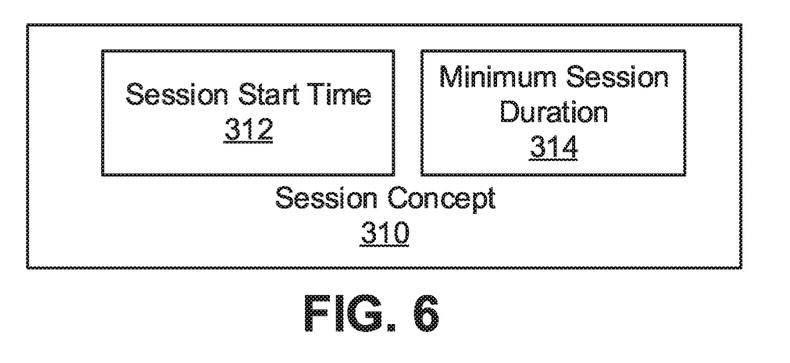
FIG. 6 is a block diagram illustrating a component configured to determine a session concept, in accordance with the present invention.

Metric-based classification device 270 can define sessions (for example, via session concept (component) 310) for the classification of the tags into at least two classes, for example, inside or outside a given checkout tunnel 140. In some embodiments additional classes can include secondary tunnels to the checkout tunnel, for example, a price check tunnel, a returns tunnel, etc. Corresponding areas can be visually marked in the store indicating where items are to be placed. According to example embodiments, the systems can automatically update a customer's balance based on where different items with RFID tags 110 are placed. Session concept 310 can also be used to define a session to classify multiple tunnels 140 at the same time. When two separate sessions for classifications of the RFID tags 110 into, for example, classes in the set A and the classes in the set B are overlapping, it can be difficult to separate the end time of one session from the other. This happens especially if any reading from any antenna 130 constitutes an outstanding reading for an RFID tag 110 that could have not been classified so far. Hence, usually concurrent sessions end almost together (concurrently). Also, if a session is not yet closed, the start of a new session may increase the current session duration.

According to example embodiments, in many instances, session concept 310 can implement a strategy of using only two fixed sets of thresholds, one for the times before reaching the maximum delay and the other one when we reach the maximum time. However, note that the thresholds for a sequential detection in the example embodiments can, in some instances, be a function of time as well. Session concept 310 can use a dynamic threshold scheme to not only satisfy the requirement of truncated sequential detection, but also to achieve the optimal region of convergence (ROC) curve in terms of the optimal false alarm and detection probabilities.

Metric-based classification device 270 can (for example, via metric combinations (component) 330) analyze such metric functions and (determine) possible ways to combine the metrics. Before attending to the formal definition of the metric (for example, via metric definition (component) 320) and its calculations, metric-based classification device 270 defines the concept of the session (for example, via session concept (component) 310) which is imperative to the definition of the metric-based classification process.

FIG. 6 is a block diagram illustrating a session concept component 310 configured to implement session concepts, in accordance with example embodiments.

The metric-based classification is defined over a given time horizon. This time horizon is called a session. The session is usually a given time window which has a start time and a maximum time duration. The maximum session time is related to the maximum tolerable delay for classification.

Therefore, in most (and in some example embodiments, all) instances session concept 310 does not require a given length for a session and the session may be ended anytime during the maximum allowable session duration. This process is for example performed thorough the sequential detection process discussed before.

However, the session start time 312 is an important factor in correct classification of the RFID tags 110. The start time may be triggered by an external process or external signal that will be received by the classification process (implemented by metric-based classification device 270). The classification process then uses such session start time 312 to calculate the metric over the time window that is causally known from the session start time 312 till the current time.

The classification process can classify RFID tags 110 independently over time which means that the metric for each RFID tag 110 is dynamically calculated over time as the readings are received by the RFID reader 120. Hence, metric-based classification device 270 performs the decision dynamically as soon as the metric for a given RFID tag 110 crosses a threshold.

Alternatively, the classification process can use the tag dependencies over time which means that while metric-based classification device 270 does not decide to end the session, all tags will be jointly classified over time. In some example embodiments, after the end of a session, metric-based classification device 270 can save the parameters of the classifications so that the new observations received later (after the end of the session) can change the classifications that were performed during the session time. Further, in some example embodiments, observations prior to the start of the session can also be used as a way to initialize the metric in the case of independent classification or such observations may be used jointly with the new observations during the session in order to classify the RFID tags 110. The observations prior or after the session may come from the walk-through gate (WTG) systems and their associated antennas 130 as well as an external antenna 130. The WTG can include software and hardware components, for example the visual signs on the floor, lights, etc.

An example of such use case is where during the checkout process while a customer passes through the WTG (for example, corresponding to a checkout tunnel 140), metric-based classification device 270 will decide to find the content of the checkout bin within a given WTG or checkout tunnel 140. However, in instances in which a late billing is also possible, the RFID reader data 272 that will be available to the system beyond the readings that were performed during the session time can, in some instances, be used to re-classify the checkout bin.

Hence, the soft values of the metric or joint metric before the hard decision in the classification process can be useful especially in those situations. The reason is that this metric may be used as an excerpt of the information gathered within the session duration and alteration of such soft output is more meaningful (for example, more accurate) than simply using the hard decisions.

The session can also have a minimum session duration 314. Such constraint on minimum session duration 314 provides a mechanism to avoid early classification of an RFID tag 110 especially where the RFID tags 110 are classified independently. Using minimum session duration 314, metric-based classification device 270 can ensure that the classification is not performed before such minimum session duration 314.

In some applications the session start time 312 can also be defined dynamically. According to an example embodiment, the metric-based classification device 270 can use a function (for example the same or different metric) of the RFID readings to trigger such session start time 312 when it crosses a threshold. An alternative implementation is where the session start time 312 is always a constant time before the current time where the classification is performed within this constant time window. In such cases, naturally the maximum or minimum session time may not be defined. Metric-based classification device 270 can use such running window session to classify RFID tags 110 on the y. An example of such classification is the classification of the RFID tags 110 in counter-top checkout or bin checkout-based systems where the items can be freely added or removed from the checkout are (e.g., bin or counter-top).

Finally, note that the running window defined earlier can include a positive window function that weighs the importance of each sample or metric over time. For example, metric-based classification device 270 can use a window function to add a weight to the calculation of the metric over the window to emphasize the more recent samples more than the older samples.

Figure 7:
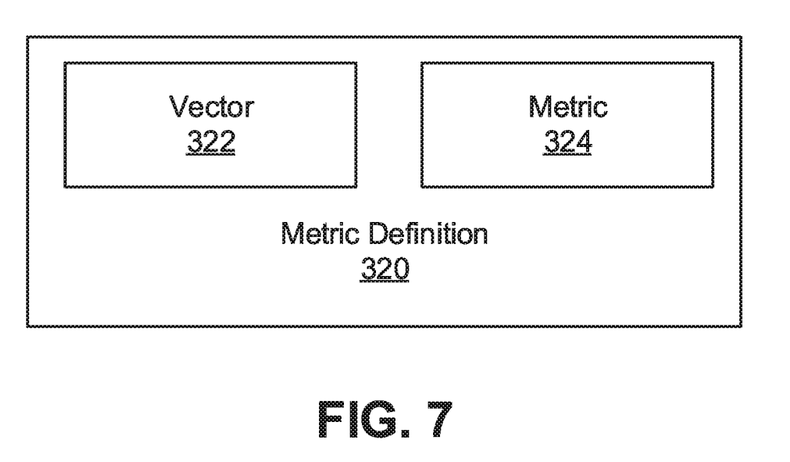
FIG. 7 is a block diagram illustrating a component configured to determine a metric definition, in accordance with the present invention.

FIG. 7 is a block diagram illustrating a metric definition component 320 configured to determine and implement a definition of metric, in accordance with example embodiments.

Metric definition component 320 considers an arbitrary RFID tag 110 denoted by its electronic product code (EPC) as $\in$. Assume that during the session denoted by the window time $\mathcal{W}$ there are W readings where the input is denoted by $x_i$ and the corresponding output is denoted by $y_i$. The input is a vector 322 that includes the reader transmit power, the frequency used, the antenna port and possibly other reader setting parameters and the output is the received signal strength (RSSI), the phase difference between the received signal and the transmitted signal (Phase), and the doppler shift and possibly other received signal attributes that is directly measured or calculated, e.g., the estimated distance of the tag from the reader.

There is a real number associated with each such reading for a given tunnel T that is defined as a metric for the reading ($y_i$, $x_i$) and the session T. The metric 324 is denoted by the function $\mu(T, y_i, x_i)$. Similarly, with an abuse of notation, the metric 324 can be defined for any pair of readings ($y_i$, $x_i$) and ($y_j$, $x_j$) and is denoted by $\mu(T, y_i, x_i, y_j, x_j)$. In general the metric 324 can be defined for any number of readings, e.g., n, over time as $\mu(T, y_1, x_1, y_2, x_2, \ldots, y_n, x_n)$.

The terminology, "singleton" refers to a single reading, for example, ($y_i$, $x_i$). Similarly, the terminology "pair" refers to a pair of readings T, $y_i$, $x_i$, $y_j$, $x_j$), and the metric definition component 320 uses n'h order readings to refer to n readings ($y_1$, $x_1$, $y_2$, $x_2$, \ldots, $y_n$, $x_n$).

The dependency of the metric $\mu$ to the tunnel and any n tuple of readings ($y_1$, $x_1$, $y_2$, $x_2$, \ldots, $y_n$, $x_n$) can be simplified as a linear function that is considered as multiplication of a weight to a metric function that is independent of the tunnel, i.e., $$\mu(T,y_1,x_1,y_2,x_2,\ldots,y_n,x_n)=w(T,y_1,x_1,y_2,x_2,\ldots,y_n,x_n)$$
$$m(y_1,x_1,y_2,x_2,\ldots,y_n,x_n) \qquad \text{Eqn. (2)}.$$

The metric for a tunnel T and tag $\in$ is defined as $$M(T,\in)=\Sigma_{i=1}^{2^W}\mu(T,y_{i_1},x_{i_1},y_{i_2},x_{i_2},\ldots,y_{i_n},x_{i_n}) \qquad \text{Eqn. (3)}.$$

where $2^W$ is the power set of the set W that consists of all n-tuples of the elements of the set S where the element of the n-tuples are always in ascending order. M is the sum of all metrics for a given EPC $\in$ (epsilon), for tunnel T.

According to an example embodiment, the metric definition component 320 focuses metric calculations only on singletons.

$$M_1(T,\in)=\Sigma_{i=1}^{W}\mu(T,y_i,x_i) \qquad \text{Eqn. (4)}.$$

or extend it to include the pairs of readings as well, i.e., $$M_1(T,\in)+M_2(T,\in)=\Sigma_{i=1}^{W}\mu(T,y_i,x_i)+\Sigma_{1\leq i\leq W, 1\leq j\leq W}\mu(T,y_i,x_i,y_j,x_j) \quad \text{Eqn. (5).}$$

Note that the definition of $M_2(T, \in)$ can be modified to include each pair of antenna 130 only once, for example, out of all possible pairs $(y_i, x_i, y_j, x_j)$, for $1 \leq i, j \leq W$ for which the antenna pair 130 $(a_i, a_j)$ is similar metric definition component 320 picks only one pair, e.g., at random or the one which has the maximum RSSI.

In one example embodiment, metric definition component 320 further simplifies the weight function $w(.)$ to be a function of the tunnel 140 and the antennas 130 in the readings 1,2, ..., n. This means that the calculation of the metric for each tag $\in$ is simplified in that it is enough to calculate $m(.)$ and then find different linear combination of $m(.)$ to find the metric for different tunnels 140. This process can be viewed as a multiplication of a matrix by a vector where the matrix consists of different rows for each tunnel and the vector consists of a column vector of all values of the function $m(.)$ for the singleton, pairs, or possibly higher order reading vectors.

Note that the metric function $M(T, \in)$ for all mentioned cases can be calculated dynamically using a simple recursion. Given that the value of $M(T, \in)$ is known up to the reading n–1, consequently the differential change in such metric only depends on the new reading.

The differential change due to singleton $(y_n, x_n)$ is $\mu(T, y_i, x_i)$, and the differential change with respects to pair will be only for the pair of readings in the form $(y_n, x_n, y_i, x_i)$, which can be computed by metric definition component 320. The same procedure can be used for higher order readings.

Figure 8:
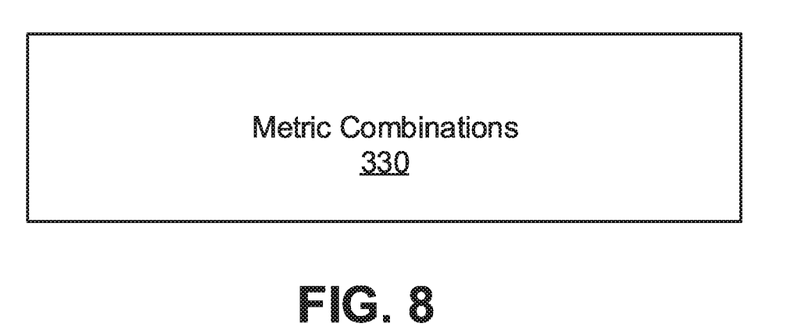
FIG. 8 is a block diagram illustrating a component configured to determine metric combinations, in accordance with the present invention.

FIG. 8 is a block diagram illustrating a metric combinations (component) 330 configured to determine metric combinations, in accordance with example embodiments.

Metric combinations (component) 330 can combine metrics using different operations. According to an example embodiment, metric combinations (component) 330 assigns the metric in the set of real numbers $\mathbb{R}$ and uses real number addition. According to a further example embodiment, metric combinations (component) 330 adds the windowing function $\theta(t-t_i)$ in the calculation of the metric, where t indicates the current time and $t_i$ indicates the time of reading i. Hence the metric $M(T, \in)$ may be re-written as:

$$M(T,\in)=\Sigma_{(i_1,i_2,\ldots,1_n)}2^W \theta(t-t_i)\mu(T,y_{i_1},x_{i_1},y_{i_2},x_{i_2},\ldots,y_{i_n},x_{i_n}) \quad \text{Eqn. (6).}$$

Another possibility is to use action excited windowing function that happens when a reading occurs. For example, when a reading from an outside antenna 130 is received, metric combinations (component) 330 can use an action exited windowing function to invalidate any readings from an inside antenna 130. The modification of the metric $M(T, \in)$ due to an action exited windowing function $\theta_i(t-t_i)$ for the action that has happened at the time $t_i$ may be re-written as.

$$M(T,\in)=\Sigma_{(i_1,i_2,\ldots,1_n)}2^W \theta_i(t-t_i)\mu(T,y_{i_1},x_{i_1},y_{i_2},x_{i_2},\ldots,y_{i_n},x_{i_n}) \quad \text{Eqn. (7).}$$

Note that the action excited windowing function $\theta_i(t-t_i)$ can be defined for the time before $t_i$ or after the time $t_i$ or the action excited windowing function can be extended in both sides before and after the action excitation time $t_i$. Also, note that this function can be zero in such window time duration which means that the other readings in this time duration are ignored. This can also be interpreted as invalidating the reading in particular time window due to some other effects such as reading of an RFID tag 110 in particular frequency, with particular antenna 130, and with a given range of RSSI.

In some embodiments of the current invention, a metric function can be used that is in the form of probabilities. Accordingly, metric combinations (component) 330 can define an addition function that preserves the properties associated with probability values. To this end metric combinations (component) 330 can take the summation using the summation defined as:

$$\mu_1 \oplus \mu_2 = \mu_1 + \mu_2 - \mu_1\mu_2 \quad \text{Eqn. (8).}$$

When this operation is defined on a set of probabilities, for example, the real values in the interval [0,1], the operation is closed. Moreover, this operation is associative, commutative, and has identity element, for example, 0. However, to form an Abelian group metric combinations (component) 330 is required to extend the set to the set of real number less than or equal to one, for example, $(-\infty, 1]$ in order to keep the closeness and add the inverse elements for every element.

Metric combinations (component) 330 can use this extension, for example, where a reading from an outside antenna 130 for the RFID tag 110 that is inside (a checkout tunnel 140) would add a negative value to the overall metric and the reading from an inside antenna 130 for the same RFID tag 110 adds a positive value to the overall metric. However, in terms of probabilities, the system can never add multiple probabilities to reach a number greater than one. So, metric combinations (component) 330 treats the values of $\mu$ under such operation in $(-\infty,1]$ as the logarithms of the probabilities or log-likelihood functions.

Figure 9:
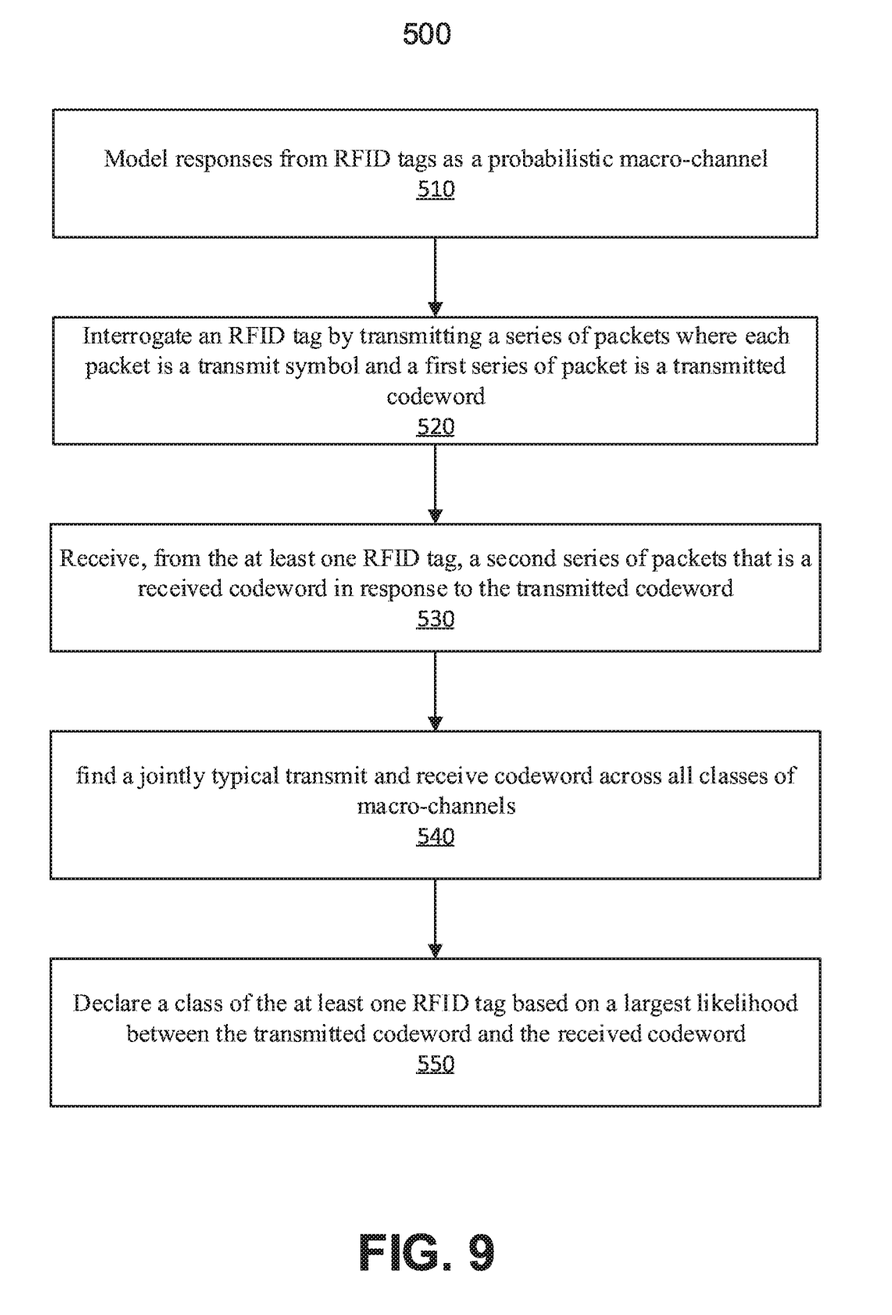
FIG. 9 is a flow diagram illustrating a method for sequential detection-based classifications of RFID Tags in three-dimensional space, in accordance with the present invention.

FIG. 9 is a flow diagram illustrating a system/method 500 for sequential detection-based classifications of RFID Tags in three-dimensional space, in accordance with the present invention.

At block 510, probabilistic classification system 300 models the response from a RFID tag 110 as a probabilistic macro-channel, for example, as described with respect to FIG. 4 herein above. According to an example embodiment, the probabilistic macro channel depends on a location of the RFID tags and at least one antenna. According to another embodiment, the probabilistic macro channel depends on a transmit antenna port, a received antenna port, and an excitation frequency. According to another embodiment, the probabilistic macro channel depends on a transmit signal power and a received signal to noise strength. According to a further embodiment, the probabilistic macro channel is a function of a phase difference and Doppler shift between a transmit signal and a receive signal.

At block 520, probabilistic classification system 300 interrogates a RFID tag by transmitting a series of packets where each packet is considered as a transmit symbol and the series of packet is the transmitted codeword.

At block 530, probabilistic classification system 300 received a series of packets that is the received codeword in response to the transmitted codeword.

At block 540, probabilistic classification system 300 finds a jointly typical transmit and receive codeword across all classes. Probabilistic classification system 300 may compute a likelihood between a transmitted signal and a received signal for each class sequentially as symbols are received. Probabilistic classification system 300 may compute the likelihood using a time dependent function.

At block 550, probabilistic classification system 300 declares the class of a RFID tag based on the largest likelihood between the transmit and receive codewords.

probabilistic classification system 300 can compare the likelihood for each to a threshold to declare if the RFID tag belongs to the class.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for sequential detection-based classifications of radio-frequency identification (RFID) tags, comprising:
    identifying RFID tags at an RFID checkout station of a store by employing an RFID reader;
    defining one or more areas adjacent the RFID checkout station as tunnels, each tunnel being a three-dimensional volume including a boundary, a shaping of the boundary of each tunnel facilitated by RF absorbers and RF reflectors;
    modeling a response from the RFID tags as a probabilistic macro-channel, the probabilistic macro-channel being an abstraction of a received reply under a given interrogation scenario and specified parameters, the abstraction analyzed as a discrete memoryless channel with a transition probability;
    interrogating, by at least one processor device, at least one RFID tag by transmitting a series of packets where each packet is a transmit symbol and a first series of packet is a transmitted codeword;
    receiving, from the at least one RFID tag, a second series of packets that is a received codeword in response to the transmitted codeword;
    finding, by the at least one processor device, a jointly transmit and receive codeword across all classes of macro-channels; and
    declaring a class of the at least one RFID tag based on a largest likelihood between the transmitted codeword and the received codeword, the class being either a first class of an RFID tag within a tunnel or a second class of an RFID tag outside a tunnel formed adjacent the RFID checkout station.

2. The method of claim 1, further comprising:
    determining a likelihood between two codewords based on a distance.

3. The method of claim 2, wherein the distance is Kullback Leibler (KL) distance defined as:

$$D_{KL}(f_i^n, f_j^n) = -\Sigma_{y^n} f_i(y_k^n \mid x^n) \log \frac{f_j(y^n \mid x^n)}{f_i(y^n \mid x^n)},$$

where a channel output y is a vector of received signal attributes, a channel input x a vector that consists of attributes used by the at least one processor device to interrogate the at least one RFID tag, n is a number of observations and i and j are two channels in at least one channel set.

4. The method of claim 1, wherein the RFID tags are identified within the one or more tunnels in a particular time interval.

5. The method of claim 1, wherein the RFID tags are identified in different sessions, a session defined as a four-dimensional section marked by a limited time interval in a particular tunnel.

6. The method of claim 1, wherein a metric for a tunnel and an RFID tag is given as:

$$M(T, \in) = \Sigma_{i=1}^{2^W} \mu(T, y_{i_1}, x_{i_1}, y_{i_2}, x_{i_2}, \ldots, y_{i_n}, x_{i_n})$$

where $2^W$ is a power set of a set W that consists of all n-tuples of elements of a set S where the elements of the n-tuples are always in ascending order, and M is a sum of all metrics for a given electronic product code (EPC) of an arbitrary RFID tag c for tunnel T.

7. The method of claim 1, wherein the probabilistic macro channel is a function of a phase difference and Doppler shift between a transmit signal and a receive signal.

8. The method of claim 1, further comprising:
    computing a likelihood between a transmitted signal and a received signal for each class sequentially as symbols are received.

9. The method of claim 8, wherein computing the likelihood depends on an entire series of symbols that have been received.

10. The method of claim 8, wherein computing the likelihood further comprises:
    using a time dependent function.

11. The method of claim 8, wherein the likelihood for each class is compared to a threshold to declare if the at least one RFID tag belongs to the class.

12. The method of claim 8, wherein a combination of two likelihoods and $\mu_2$ defined as:

$$\mu_1 \oplus \mu_2 = \mu_1 + \mu_2 - \mu_1 * \mu_2.$$

13. A computer system for sequential detection-based classifications of radio-frequency identification (RFID) tags, comprising:
    a processor device operatively coupled to a memory device, the processor device being configured to:
    identify RFID tags at an RFID checkout station of a store by employing an RFID reader;
    define one or more areas adjacent the RFID checkout station as tunnels, each tunnel being a three-dimensional volume including a boundary, a shaping of the boundary of each tunnel facilitated by RF absorbers and RF reflectors;
    model a response from the RFID tags as a probabilistic macro-channel, the probabilistic macro-channel being an abstraction of a received reply under a given interrogation scenario and specified parameters, the abstraction analyzed as a discrete memoryless channel with a transition probability;
    interrogate at least one RFID tag by transmitting a series of packets where each packet is a transmit symbol and a first series of packet is a transmitted codeword;
    receive, from the at least one RFID tag, a second series of packets that is a received codeword in response to the transmitted codeword;
    find a jointly transmit and receive codeword across all classes of macro-channels; and
    declare a class of the at least one RFID tag based on a largest likelihood between the transmitted codeword and the received codeword, the class being either a first class of an RFID tag within a tunnel or a second class of an RFID tag outside a tunnel formed adjacent the RFID checkout station.

14. The system as recited in claim 13, wherein the processor device is further configured to:
determine a distance between two codewords based on a Kullback-Leibler (KL) distance.

15. The system as recited in claim 13, wherein the RFID tags are identified within the one or more tunnels in a particular time interval.

16. The system as recited in claim 13, wherein the RFID tags are identified in different sessions, a session defined as a four-dimensional section marked by a limited time interval in a particular tunnel.

17. The system as recited in claim 13, wherein a metric for a tunnel and an RFID tag is given as:

$$M(T,\in)=\Sigma_{i=1}^{2^W}\mu(T,y_{i_1},x_{i_1},y_{i_2},x_{i_2},\ldots,y_{i_n},x_{i_n})$$

where $2^W$ is a power set of a set W that consists of all n-tuples of elements of a set S where the elements of the n-tuples are always in ascending order, and M is a sum of all metrics for a given electronic product code (EPC) of an arbitrary RFID tag $\in$ for tunnel T.

18. The system as recited in claim 13, wherein the probabilistic macro channel is a function of a phase difference and Doppler shift between a transmit signal and a receive signal.

19. The system as recited in claim 13, wherein the processor device is further configured to:
compute a likelihood between a transmitted signal and a received signal for each class sequentially as symbols are received.

20. A computer program product for sequential detection-based classifications of radio-frequency identification (RFID) tags, the computer program product comprising a non-transitory computer readable storage medium having program instructions embodied therewith, the program instructions executable by a computing device to cause the computing device to perform the method comprising:
identifying RFID tags at an RFID checkout station of a store by employing an RFID reader;
defining one or more areas adjacent the RFID checkout station as tunnels, each tumid being a three-dimensional volume including a boundary, a shaping of the boundary of each tunnel facilitated by RF absorbers and RF reflectors;
modeling a response from the RFID tags as a probabilistic macro-channel, the probabilistic macro-channel being an abstraction of a received reply under a given interrogation scenario and specified parameters, the abstraction analyzed as a discrete memoryless channel with a transition probability;
interrogating, by at least one processor device, at least one RFID tag by transmitting a series of packets where each packet is a transmit symbol and a first series of packet is a transmitted codeword;
receiving, from the at least one RFID tag, a second series of packets that is a received codeword in response to the transmitted codeword;
finding, by the at least one processor de vice, a jointly transmit and receive codeword across all classes of macro-channels; and
declaring a class of the at least one RFID tag based on a largest likelihood between the transmitted codeword and the received codeword, the class being either a first class of an RFID tag within a tunnel or a second class of an RFID tag outside a tunnel formed adjacent the RFID checkout station.

* * * * *